United States Patent [19]
Chen et al.

[11] Patent Number: 5,756,651
[45] Date of Patent: May 26, 1998

[54] IMPACT MODIFIED POLYLACTIDE

[75] Inventors: Xiaomao Chen; Kevin H. Schilling, both of Arvada; William E. Kelly, Jr., Littleton, all of Colo.

[73] Assignee: Chronopol, Inc., Golden, Colo.

[21] Appl. No.: 682,095

[22] Filed: Jul. 17, 1996

[51] Int. Cl.⁶ .................................................. C08G 63/08
[52] U.S. Cl. .......................... 528/354; 528/361; 523/124; 524/306; 524/310; 524/315; 524/317; 524/320
[58] Field of Search ........................ 528/354, 361; 523/124; 524/306, 310, 315, 317, 320

[56] References Cited

U.S. PATENT DOCUMENTS

| | | | |
|---|---|---|---|
| 1,995,970 | 3/1935 | Dorough | 260/2 |
| 2,362,511 | 11/1944 | Tetters | 260/78 |
| 2,668,162 | 2/1954 | Lowe | 260/78.3 |
| 2,683,136 | 7/1954 | Higgins | 260/78.3 |
| 2,703,316 | 3/1955 | Schneider | 260/78.3 |
| 2,758,987 | 8/1956 | Salzberg | 260/78.3 |
| 2,951,828 | 9/1960 | Zeile et al. | 260/77.5 |
| 3,297,033 | 1/1967 | Schmitt et al. | 128/335.5 |
| 3,463,158 | 8/1969 | Schmitt et al. | 128/334 |
| 3,531,561 | 9/1970 | Trehu | 264/210 |
| 3,565,869 | 2/1971 | DeProspero | 260/78.3 |
| 3,636,956 | 1/1972 | Schneider | 128/335.5 |
| 3,736,646 | 6/1973 | Schmitt et al. | 29/458 |
| 3,739,773 | 6/1973 | Schmitt et al. | 128/92 |
| 3,755,558 | 8/1973 | Scribner | 424/47 |
| 3,773,919 | 11/1973 | Boswell et al. | 424/19 |
| 3,797,499 | 3/1974 | Schneider | 128/334 |
| 3,887,699 | 6/1975 | Yolles | 424/19 |
| 3,982,543 | 9/1976 | Schmitt et al. | 128/335.5 |
| 4,273,920 | 6/1981 | Nevin | 528/361 |
| 4,279,249 | 7/1981 | Vert et al. | 128/92 D |
| 4,471,077 | 9/1984 | Lange | 521/64 |
| 4,526,938 | 7/1985 | Churchill et al. | 525/415 |
| 4,534,349 | 8/1985 | Barrows | 128/334 R |
| 4,578,384 | 3/1986 | Hollinger | 514/8 |
| 4,603,171 | 7/1986 | Hsieh et al. | 525/105 |
| 4,621,638 | 11/1986 | Silvestrini | 128/335.5 |
| 4,646,741 | 3/1987 | Smith | 128/334 R |
| 4,661,530 | 4/1987 | Gogolewski et al. | 521/137 |
| 4,719,246 | 1/1988 | Murdoch et al. | 521/134 |
| 4,720,384 | 1/1988 | Di Luccio et al. | 424/78 |
| 4,741,337 | 5/1988 | Smith et al. | 128/334 R |
| 5,076,983 | 12/1991 | Loomis et al. | |
| 5,180,765 | 1/1993 | Sinclair | 524/306 |
| 5,252,642 | 10/1993 | Sinclair et al. | 524/108 |
| 5,292,782 | 3/1994 | Bastioli et al. | 524/47 |
| 5,412,005 | 5/1995 | Bastioli et al. | 524/47 |
| 5,502,158 | 3/1996 | Sinclair et al. | 528/354 |

FOREIGN PATENT DOCUMENTS

| | | |
|---|---|---|
| 84/00303 | 2/1984 | WIPO . |
| 86/00533 | 1/1986 | WIPO . |
| WO 92/04412 | 3/1992 | WIPO . |
| WO 92/15340 | 9/1992 | WIPO . |
| WO 94/11441 | 5/1994 | WIPO . |

OTHER PUBLICATIONS

Joziasse, et al., "Supertough poly(lactide)s", Department of Polymer Chemistry, University of Groningen, Nijenborgh 4, 9747 AG Groningen, The Netherlands, Polymer Bulletin, 1994.

Grijpma, et al., "Rubber Toughening of Poly(Lactide) by Blending and Block Copolymerization", Department of Polymer Chemistry, University of Groningen, Groningen, The Netherlands, Polymer Engineering and Science, Nov. 1994, vol. 34, No. 22.

Porous Biomedical Materials Based on Mixtures of Polylactides and Polyurethanes; Gogolewski S., et al.; Makromol. Chem. Rapid Commun. 3, 1982, pp. 839–845.

Phase Separation in Poly(Ethylene Glycol)/Poly(Lactic Acid) Blends, Younes, H. et al; Eur. Polym. J. vol. 24, No. 8, 1988, pp. 765–773.

*Primary Examiner*—Duc Truong
*Attorney, Agent, or Firm*—Sheridan Ross P.C.

[57] ABSTRACT

The present invention is directed to degradable blends containing polylactide, a degradable impact modifier, and a degradable plasticizer for use in packaging films. The degradable impact modifier can be a degradable, non-toxic elastomer or a degradable, non-toxic, non-elastomeric polymer having a low glass transition temperature, such as polycaprolactone and poly(ethylene glycol). The degradable plasticizer can be any plasticizer having a relatively low molecular weight, a high degree of miscibility with polylactide, and non-toxicity. The film has excellent flexibility and impact strength for packaging applications.

43 Claims, No Drawings

IMPACT MODIFIED POLYLACTIDE

FIELD OF THE INVENTION

The present invention relates generally to impact modified degradable materials and specifically to impact modified polylactide films.

BACKGROUND OF THE INVENTION

Degradable materials are being investigated for a wide variety of packaging applications to ameliorate the environmental problems associated with conventional, non-degradable packaging plastics, such as polypropylene, polyethylene, poly(vinyl chloride) and polyethylene terephthalate. A promising degradable packaging material is polylactide. When contacted with water, polylactide depolymerizes and decomposes into naturally occurring substances, such as lactic acid, and ultimately can be reduced to water and carbon dioxide. This process is facilitated by heat such as is found in composting.

In typical packaging applications, a desirable degradable packaging material requires a high degree of flexibility and a high impact strength. The amorphous and semi-crystalline forms of polylactide lack these properties. Amorphous and semi-crystalline polylactide have a low impact strength. Both semi-crystalline and amorphous polylactide have a low degree of flexibility.

One method for altering the properties of polylactide to provide greater impact strength is to blend polylactide with non-degradable elastomers or to copolymerize lactide blocks with elastomeric blocks. The elastomeric phase in the composition absorbs the impact energy and thereby improves the impact strength of the polymeric materials. Although such blends are more flexible than semi-crystalline polylactide, they nonetheless have a Young's modulus that is too high for many packaging applications. Additionally, the elastomers commonly employed are not degradable, which is unacceptable for degradable packaging materials. All of the components of a degradable packaging material should be capable of substantially complete degradation.

There is thus a need for a degradable film that has a high degree of flexibility and a high impact strength.

Another need is for a degradable packaging film whose components are each degradable in the environment.

Yet another need is for a degradable polylactide packaging film having a high degree of flexibility and a high impact strength. A related need is for a degradable lawn/trash bag having a high degree of flexibility and a high impact strength.

SUMMARY OF THE INVENTION

In accordance with the present invention, a degradable film is provided having a high impact resistance that is particularly suitable for packaging applications. The degradable film includes (a) at least about 50% by weight of a crystalline polylactide as the primary polymer; (b) a degradable impact modifier; and (c) a degradable plasticizer having a weight average molecular weight of no more than about 2,000 daltons.

Surprisingly, it has been discovered that the incorporation of both a degradable impact modifier and plasticizer in the blend yields an attractive combination of high tensile and impact strengths on the one hand and high flexibility on the other. One of ordinary skill in the art would not expect a plasticizer to be a suitable additive to provide high tensile and impact strengths because the large amounts of plasticizer required to yield the desired impact strength and a relatively low Young's modulus can cause numerous processing problems and an unacceptably low film tensile strength. One of ordinary skill in the art would not expect an impact modifier to be a suitable additive to provide high tensile strength and flexibility because an unacceptably large amount of impact modifier is required to yield the desired impact strength and such a large amount of impact modifier can render the modifier immiscible in the polylactide and thereby render the blend useless for forming films.

The polylactide films of the present invention and the various additives contained in the films can degrade in a variety of ways, including, but not limited to, hydrolytic, biological, chemical, mechanical, photo, and/or thermal degradation. The preferred degradation mechanism for the degradable films is hydrolytic degradation, though other degradation methods can be used to further degrade the degradable films. Hydrolytic degradation is the process by which moisture penetrates a degradable film and hydrolyzes, for example, ester bonds, thereby breaking down polymers in the material. Without being bound by any theory, hydrolytic degradation is thought to proceed through a series of somewhat overlapping steps, including: (i) diffusion of water into the material; (ii) initial hydrolysis yielding polymers with reduced molecular weight (i.e., conversion of polymers to oligomers); (iii) continued loss of molecular weight (i.e., formation of smaller oligomers) and gradual loss of plasticizers incorporated into the films; (iv) initial loss of physical properties (e.g., pliability); (v) loss of further properties resulting in an opaque and hazy material; (vi) major loss of physical properties, such as tensile strength and form-stability; (vii) weight loss; and (viii) volume loss, until the material is essentially degraded to monomers or small oligomers. Typically, the obvious loss of physical properties correlates with the reduction in molecular weight of the primary polymer in the degradable film down to a number average molecular weight of about 50,000 daltons.

The degradable impact modifier preferably has a glass transition temperature less than about 0° C. to decrease the glass transition temperature of the degradable film and thereby provide increased impact strength. Preferred impact modifiers are: (a) poly(ethylene glycol) or poly(ethylene oxide) having a preferred weight average molecular weight ranging from about 2,000 to about 25,000 daltons; (b) polycaprolactone having a preferred weight average molecular weight ranging from about 2,000 to about 150,000 daltons; (c) a copolymer of lactic acid or ester thereof and caprolactone having a preferred weight average molecular weight ranging from about 2,000 to about 200,000 daltons; and (d) an oligomer of lactic acid having a preferred weight average molecular weight ranging from about 500 to about 10,000 daltons. The content of the modifier in the degradable film preferably ranges from about 3 to about 25% by weight.

Preferred degradable plasticizers are substantially free of lactic acid, such as citrate esters, adipate esters, epoxidized soy oil, acetylated coconut oil sold under the trademark "EPZ", linseed oil, and mixtures thereof. The content of the plasticizer in the degradable film preferably ranges from about 5 to about 20% by weight.

In one embodiment, the degradable film has more than one impact modifier to realize improved impact and tensile strengths. Preferably the first degradable impact modifier is poly(ethylene glycol) and/or poly(ethylene oxide), which have been found to have the a relatively high influence on impact strength compared to other degradable impact modifiers. Preferably, the second degradable impact modifier is a polycaprolactone homopolymer or a copolymer of lactic acid or an ester thereof with caprolactone, which have been found to have a relatively high influence on tensile strength.

The degradable film can have a number of attractive properties, in particular for packaging applications. By way of example, the degradable film can be fully degradable in the environment, preferably within 3 years of disposal and with no toxic byproducts; have a Young's modulus ranging from about 10 to about 90 kpsi; a dart drop impact strength ranging from about 30 to about 500 g/mil; a yield strength ranging from about 0 to about 5 kpsi; a tear propagation resistance maximum load ranging from about 5 to about 250 gram force/mil; a breaking strength ranging from about 1 to about 7 kpsi; and an elongation to break ranging from about 100 to about 750%.

The present invention further includes a method for forming a degradable film. The method includes the steps: (a) blending at least about 50% by weight of the semi-crystalline polylactide with the degradable impact modifier and plasticizer; (b) forming the degradable impact modified material into a degradable film; and (c) biaxially orienting the degradable film to form an oriented degradable film. "Biaxial orientation" refers to any process that stretches a film in two distinct directions. This broad definition of biaxial orientation thus includes not only mechanical biaxial orientation techniques in which a machine sequentially or simultaneously stretches the film in the direction of machine travel (the machine direction ("MD")) and in the direction orthogonal to the machine direction in the plane of the film (the transverse direction ("TD")), but also tube blowing techniques. The biaxial orienting step is preferably performed by blowing the films. For best results, the blowup ratio ranges from about 1.5:1 to about 6:1, and the drawdown ratio from about 2:1 to about 40:1. "Blowup ratio" is the ratio of the size of the die through which the blend is extruded and blown to the diameter of the blown film bubble. "Drawdown ratio" is the machine direction analog to the blowup ratio.

DETAILED DESCRIPTION

The degradable film of the present invention has excellent properties for use as a packaging material particularly as lawn and trash bags. The film is a blend of polylactide as the major component, a degradable impact modifier for increased impact strength, and a degradable low molecular weight plasticizer both for increased impact strength and flexibility. The film is particularly useful for packaging applications, such as food packaging and garbage bags. As used herein, "polylactide" refers to polymers formed from lactic acid or its cyclic or linear esters, such as lactide and lactates.

Surprisingly, both a plasticizer and an impact modifier in the blend have been found to yield a highly desired combination of high tensile and impact strengths and low Young's modulus required for most packaging applications. Although the plasticizer increases film flexibility (i.e., decreases the Young's modulus), the plasticizer alone cannot yield the properties required for most packaging applications because the large amounts of plasticizer required to yield the desired impact strength and Young's modulus (i.e., more than about 15% plasticizer by weight) can cause numerous processing problems, e.g., blocking of the film, and an unacceptably low film tensile strength. Similarly, though the impact modifier also decreases the glass transition temperature (though typically not as much as the same amount of plasticizer) and therefore increases the impact strength and film flexibility, an unacceptably large amount of impact modifier is required to yield the desired properties. In practice, such a large amount of impact modifier can render the modifier immiscible in the polylactide and thereby render the blend useless for forming films. For these reasons, the degradable plasticizer is used to cause the bulk of the decrease in both the Young's modulus and glass transition temperature (i.e., increase in impact strength) and the impact modifier to further decrease the Young's modulus and glass transition temperature to the desired levels.

The degradable primary polymer in the blend is polylactide. Preferably, the amount of polylactide in the film is at least about 50% by weight and more preferably ranges from about 70 to about 90% by weight and most preferably from about 75 to about 85% by weight. The polylactide has a relatively high weight average molecular weight to impart tensile strength to the film. The weight average molecular weight preferably ranges from about 100,000 to about 500,000 daltons, more preferably from about 120,000 to about 300,000 daltons, and most preferably from about 130,000 to about 250,000 daltons.

To yield the desired film properties, the polylactide is in the semi-crystalline and not the amorphous form. As will be appreciated, it is possible for a semi-crystalline polymer to also have amorphous regions. Amorphous polylactide, which is polylactide having an amorphous structure, has too low an impact strength and too little shape memory to form a useful film for most applications. As will be appreciated, at temperatures at or above the glass transition temperature, amorphous polylactide is too soft to have a shape memory and, therefore, is not useful. To form semi-crystalline polylactide, it is preferred that at least about 90% and more preferably at least about 95% of the repeating units in the polylactide be one of either L- or D-stereoisomers. It is further preferred that the polylactide have a thermal history that is conducive to a high degree of crystallinity. The processing is conducted in such a way that facilitates crystalline formation.

The degradable impact modifier can be a degradable, non-toxic elastomer or a degradable, non-toxic non-elastomeric polymer having a low glass transition temperature (i.e., preferably 0° C. or less) provided that the elastomer or non-elastomeric polymer are blend compatible with polylactide. Because of the lack of commercially available degradable elastomers, degradable non-elastomeric polymers are generally preferred. Unlike elastomers which typically improve impact strength by absorbing the energy of the impact through deformation of the elastomer, non-elastomeric polymers having a low glass transition temperature decrease the glass transition temperature of the film, thereby softening the film and increasing the amount of energy that the film can absorb through deformation. Although the end groups on the non-elastomeric polymers can act as a plasticizer and decrease the film's tensile strength, the degree of end group plasticization is believed to decrease as the length of the elastomeric chain increases. This limits the amount of decrease in tensile strength relative to shorter chain, lower molecular weight elastomeric polymers. Preferred degradable non-elastomeric polymers are polycaprolactone, a copolymer of lactic acid or its esters with caprolactone, an oligomer of lactic acid or its esters, poly(ethylene oxide), poly(ethylene glycol), and mixtures thereof. More preferred degradable non-elastomeric polymers are polycaprolactone, a copolymer of lactic acid or its esters with caprolactone, poly(ethylene oxide), poly(ethylene glycol), and mixtures thereof. The copolymer of lactic acid or its esters with caprolactone preferably contains an amount of lactic acid or its esters ranging from about 5 to about 60% by weight, more preferably from about 8 to about 40% by weight and most preferably from about 10 to about 30% by weight.

As will be appreciated, the molecular weight of the degradable impact modifier has a significant influence on the properties of the film. The preferred molecular weight depends on the impact modifier. When the impact modifier is polycaprolactone, the impact modifier has a weight average molecular weight preferably ranging from about 2,000 to about 150,000 daltons and more preferably from about 3,000 to about 140,000 daltons. When the impact modifier is a copolymer of lactic acid or its esters with caprolactone, the impact modifier's weight average molecular weight preferably ranges from about 2,000 to about 200,000 daltons and more preferably from about 3,000 to about 180,000 daltons. When the impact modifier is an oligomer of lactic acid, the impact modifier's weight average molecular weight preferably ranges from about 500 to about 10,000 daltons and more preferably from about 550 to about 9,000 daltons. To inhibit premature degradation of the polylactide, the end groups of the lactic acid oligomers are preferably rendered less reactive by end capping. Finally, when the impact modifier is poly(ethylene glycol) and/or poly(ethylene oxide), the impact modifier's weight average molecular weight preferably ranges from about 2,000 to about 25,000 daltons and more preferably from about 3,000 to about 20,000 daltons. At weight average molecular weights above 25,000 daltons, poly(ethylene glycol) and poly(ethylene oxide) are typically not degradable in the environment.

The amount of the degradable impact modifier required to realize the desired film properties depends upon the degree of miscibility of the modifier in the polylactide. As will be appreciated, the properties of polymer blends are strongly dependent upon the degree of compatibility and/or miscibility of the components. Compatibility refers to the degree of macroscopic heterogeneity of a polymer mixture while miscibility refers to the extent of homogeneity at the molecular level. Only a few blends are truly miscible at the microscopic level while most are semi-miscible, such as for example the blends of the present invention. Preferably, the amount of modifier in the film ranges from about 3 to about 40% by weight, more preferably from about 5 to about 30% by weight, and most preferably from about 10 to about 25% by weight of the film.

The degradable plasticizer can be any plasticizer that has a relatively low molecular weight to produce a desired decrease in Young's modulus and increase in impact strength for the film, is fully degradable in the environment, is miscible with polylactide and is non-toxic. It has been found that lower molecular weight plasticizers have a greater impact on the Young's modulus and glass transition temperature than higher molecular weight plasticizers. The weight average molecular weight of the plasticizer is preferably about 2,000 daltons or less, more preferably about 1,000 daltons or less, and most preferably about 500 daltons or less. Acceptable degradable plasticizers include citrate esters, adipate esters, epoxidized soy oils, acetylated coconut oil, linseed oil, and mixtures thereof, with less volatile citrate and adipate esters being most preferred.

Monomers and oligomers of hydroxy acids such as lactic acid and/or esters thereof such as lactide, though degradable, are not desirable plasticizers. The end groups in the lactic acid monomers and oligomers can cause premature degradation in the polylactide polymer. Although lactide has no end groups because it is a cyclic ester, lactide is highly volatile and can migrate to the surface of the film, thereby causing processing problems, such as lactide condensation on equipment, and undesirable alterations in the mechanical properties of the film.

The amount of the degradable plasticizer in the blend is important to yield the desired mechanical properties to the film while at the same time maintaining an adequate film tensile strength. The degradable plasticizer content of the film preferably ranges from about 5 to about 20, more preferably from about 6 to about 18, and most preferably from about 8 to about 15% by weight.

The degradable blend is preferably substantially free of impurities such as monomeric hydroxy acids and esters thereof such as lactic acid and lactide, oligomeric lactic acid (i.e., lactic acid oligomers having a weight average molecular of about 500 daltons or less), lactide, and water. As noted above, such impurities can have a significant impact on the degradation rate of the film. Preferably, the degradable blend contains about 10% by weight or less and more preferably about 5% or less by weight of such impurities.

In a particularly preferred composition, the blend contains polylactide, poly(ethylene glycol) or poly(ethylene oxide), a degradable plasticizer, and a polycaprolactone homopolymer or a copolymer of lactic acid or its esters with caprolactone. Surprisingly, it has been discovered that the use of two degradable impact modifiers, namely poly(ethylene glycol) or poly(ethylene oxide) on the one hand and polycaprolactone or copolymers of lactic acid or its esters with caprolactone on the other, produces a film having improved influence on tensile strengths compared to blends having only one degradable impact modifier. Poly(ethylene glycol) and poly(ethylene oxide) have been found to have a greater influence on impact strength than polycaprolactone or the copolymers. However, polycaprolactone and the lactic acid/caprolactone copolymers have been found to provide significantly improved tensile strengths compared to poly(ethylene glycol) or poly(ethylene oxide). The amounts of the various components used in the blend are important to realize these improved properties. The blend contains preferably from about 3 to about 15% by weight of poly(ethylene glycol) and/or poly(ethylene oxide) and preferably from about 0.1 to about 15%, and more preferably from about 1 to about 15%, by weight of poly(caprolactone) and/or lactic acid/caprolactone copolymer. The amounts of the polylactide and degradable plasticizer are as set forth above.

The degradable blend has excellent film forming and mechanical properties for most packaging applications. The blend can be formed into relatively thin films which are highly desirable for packaging applications. The films preferably have thicknesses of about 5 mils or less and more preferably ranging from about 0.5 to about 4 mils. The films can have any combination of the following desirable mechanical properties:

(a) a Young's modulus of about 120 kpsi or less, and more preferably ranging from about 5 to about 95 kpsi, and most preferably from about 10 to about 90 kpsi;

(b) a tear propagation resistance maximum load of at least about 3 grams force/mil, and more preferably ranging from about 4 to about 275 grams force/mil, and most preferably from about 5 to about 250 grams force/mil;

(c) a yield stress preferably of less than about 5 kpsi, more preferably ranging from about 0.5 to about 5 kpsi, and most preferably ranging from about 1 to about 4 kpsi;

(d) a breaking strength (or tensile strength) of at least about 1 kpsi and more preferably ranging from about 1.5 to about 6.5 kpsi and most preferably from about 2 to about 6 kpsi;

(e) a percent elongation at break of at least about 50% and more preferably ranging from about 100 to about 750% and most preferably from about 200 to about 450%;

(f) a dart drop impact strength (i.e., impact strength measured by the Dart Drop impact strength test) of at least about 30 g/mil and more preferably ranging from about 50 to about 500 g/mil and most preferably from about 60 to about 450 g/mil. As will be appreciated, the impact strengths for a material measured by the IZOD test and by the Dart Drop test are related but of substantially different magnitudes.

The degradable blend can include a variety of other degradable, non-toxic, and/or environmentally benign additives depending upon the application to improve further film properties. The blend can include a non-toxic and/or environmentally benign anti-blocking agent to enhance the film forming properties of the blend. Preferred non-toxic and environmentally benign anti-blocking agents include talc, zinc stearate, fumed silica, calcium stearate, and mixtures thereof. Preferably, the amount of agent in the blend ranges from about 0.5 to about 10% by weight. The blend can include a non-toxic and/or environmentally benign antioxidant or stabilizer to inhibit oxidation of the various components in the blend. Preferred non-toxic and environmentally benign stabilizers include hindered phenolics, hindered amines, phosphite compounds, and mixtures thereof. Preferably, the amount of stabilizer in the blend ranges from about 0.1 to about 2% by weight. The blend can include a non-toxic and/or environmentally benign lubricant, such as epoxidized soy oil, fatty acid esters, and mixtures thereof, to improve the film forming properties and processability of the blend. Preferably, the amount of lubricant in the blend ranges from about 0.1 to about 2% by weight. Finally, the blend can include a degradable compatibilizer to increase the miscibility of the degradable impact modifier in the polylactide. Preferred degradable compatibilizers include poly(lactide-co-caprolactone) when the degradable impact modifier is polycaprolactone and poly(lactide-co-ethylene glycol) or poly(lactide-co-ethylene oxide) when the degradable impact modifier is poly(ethylene glycol) or poly(ethylene oxide). Preferably, the amount of compatibilizer in the blend ranges from about 0.5 to about 10% by weight.

It is preferred that the degradable blend be substantially free of starch to provide improved shelf life of the film. Starch is a common additive for numerous existing thermoplastics to impart degradability. The combination of the degradable polylactide, degradable impact modifier and degradable plasticizer with starch would significantly increase the degradation rate of the film and provide in many applications an unacceptable shelf life.

The degradable blend can be produced by either melt blending or solution blending techniques, with melt blending techniques being most preferred. Melt blending is preferably done in a twin screw extruder or some other type of heated, continuously stirred reactor. The polylactide and degradable impact modifier are physically blended and passed through the reactor where the physical blend is melted at temperatures ranging from about 160° to about 220° C. and the discrete components intimately blended together. The degradable plasticizer is preferably added directly to the reactor at a point where the blend is completely melted. The resulting blend can be extruded, quenched, and pelletized or formed directly into films, as desired.

If the blend is pelletized or extruded and formed directly into films, the pellets can be formed into degradable films by a number of different techniques. In either case, the blend is preferably formed into blown films.

Blown films inherently have some degree of biaxial orientation which provides improved mechanical properties in most packaging applications. The blowing process orients the molecules in the transverse direction due to horizontal stretching of the film. The extent of biaxial orientation in the transverse direction is related to the blowup ratio. The blowing process also orients the molecules in the machine direction due to vertical stretching of the film. Vertical stretching results when the take-up speed exceeds the extrusion speed and is sometimes called machine direction drawdown. The extent of machine direction orientation is determined by the velocity of the take-off rolls relative to the linear extrusion speed and is described by the drawdown ratio.

Because the desired optimization of mechanical properties is achieved by biaxial orientation, the desired degree of orientation in either the transverse or machine directions can be achieved by independent adjustment of the blowup ratio and drawdown ratio (i.e., the take-off speed). The preferred blowup ratio ranges from about 1.5:1 to about 6:1 and more preferably from about 2:1 to about 5:1, with about 4:1 being most preferred. The drawdown ratio preferably ranges from about 2:1 to about 40:1 and more preferably from about 4:1 to about 20:1, with about 10:1 being most preferred.

In some applications, the film is biaxially oriented by mechanically stretching the film in two directions to provide more uniform mechanical properties. In mechanical biaxial orientation techniques, it is preferred that the film be stretched to at least 2 times its initial machine direction and transverse direction dimensions while the film is heated and maintained at a temperature above the glass transition temperature of the degradable blend but below the melting temperature of the blend. Preferably, the temperature of the film is maintained at a temperature that is at least 15% below the blend's melting point (i.e., at a temperature from about 70° to about 130° C.). As will be appreciated, the biaxially oriented films can be made non-shrinkable by heat-setting at temperatures above the blend's glass transition temperature but below the blend's melting temperature while maintaining the film under restraint (i.e., at a temperature from about 70° to about 130° C.).

EXPERIMENTAL

In the experiments below, the effects of plasticizers and low glass transition temperature ("$T_g$") polymers on impact strength and tensile strength of polylactide were examined. The low $T_g$ polymers included homopolymers like polycaprolactone and poly(ethylene glycol), and elastomeric copolymers of lactide and caprolactone.

In the various experiments, certain standard procedures were followed. The monomers and catalysts were stored under argon during the course of the experiments. L-lactide was made by cyclization techniques, with a typical water content of 40 ppm and a free acid content of 1.0 meq/Kg. D-lactide was purchased from a supplier. Stannous 2-ethylhexanoate (i.e., stannous octoate, $Sn(Oct_2)$) was used as purchased without further purification. Epsilon caprolactone ("ε-CL") was also purchased and used without further purification. Poly(epsilon-caprolactone) ("PCL") triol and poly(ethylene glycol) ("PEG") with weight average molecular weights of 4,000 and 20,000, respectively, were dried overnight under vacuum at 70° C. prior to use. Polycaprolactone tetrol with a weight average molecular weight of 1,000 and polycaprolactone with a weight average molecular weight of 80,000 were dried in vacuum at 40° C. overnight prior to use. All plasticizers were dried in vacuum at 40° C. overnight prior to use. Talc and calcium stearate were baked at 120° C. overnight before use.

To form polylactide homopolymer ("PLA") and random poly(lactic acid-co-caprolactone) copolymers (referred to as either "RCI" or "RCII"), stannous octoate was used as the catalyst or initiator. The molar ratio of monomer to catalyst was about 10,000:1 (i.e., 100 ppm catalyst). The monomers and the catalysts were transferred to a pre-baked, tin-plated, steel (paint) can inside a dry, argon purged glove box. The can was sealed, removed from the glove box, then placed in an oven at 170°±20° C. for 6–24 hours (6 hours for homopolymer and 24 hours for random copolymers). The can was shaken to mix the reactants by hand several times before the contents became too viscous to shake.

Block copolymers of epsilon caprolactone and lactide were synthesized in a device sold under the trademark "HAAKE RHEOMIX 3,000". The "HAAKE RHEOMIX 3,000" head consisted of a heated mixing bowl with a heated polytetrafluoroethylene ("Teflon") gasket front and rear plates and two gear-driven roller-style mixing rotors. The head is attached to a control unit sold under the trademark "HAAKE RHEODRIVE 5,000" which provides heating and cooling to the mixing bowl, drives the mixing rotors and measures the rotor torque. Most of polymerization runs were done at 180° C. First step polymerization was started with the addition of epsilon caprolactone (in some cases, lactide was added to make amorphous soft phase material) and catalyst (stannous octoate), and initiator (polyols like glycerol). The change in torque level was used to indicate or track the viscosity build-up of the mixture, which approximately indicated the extent of polymerization. When the torque reached a maximum in the first polymerization step, lactide and other materials were added to start the second polymerization step. The torque level was again monitored until the maximum torque was reached. In order to minimize possible moisture contamination, monomer and catalyst (or initiator) were weighed into a beaker inside the argon-purged glove box, then quickly taken out, covered with aluminum foil and poured into the preheated (180° C.) mixing bowl with the rotors turning at 36 rpm. The heating/melting process took about 2–3 minutes.

Polymer blends were made in the head, as described above, at about 180° C. and 30 rpm for 5 minutes. All of the components were dried prior to use, as mentioned above. The blends formed in the head were ground into fine granules using a grinder manufactured by "NELMOR".

Cast and blown films were produced in an extruder manufactured by HAAKE with flat (6 inch) and circular (1 inch) dies, respectively. There are three heating zones for both setups: T1 (pre-melting), T2 (melting), and T3 (die). The temperatures of these various zones were set according to the melt behavior of the particular material.

Differential scanning calorimeter ("DSC") was conducted using a device sold under the trademark "PERKIN-ELMER DSC-7" at a heating rate of 10° C. per minute. Gel permeation chromatography ("GPC") analysis was conducted in a GPC analyzer sold under the trademark "HEWLETT PACKARD SERIES 1050" equipped with two columns sold under the trademark "MIXED-D HEWLETT PACKARD". Tetrahydrofuran was used as eluent at 30° C. and flow rate of 0.8 ml per minute. Polystyrene was used for molecular weight standards (range from 2,500–1,000,000). A polylactide of molecular weight 200,000 was used as additional molecular weight standard. Residual (unreacted) lactide and residual epsilon caprolactone were analyzed by gas chromatography on a gas chromatograph sold under the trademark "HEWLETT PACKARD 5890" (column type: "RESTEK RTX-5" oven temperature 300° C., injection temperature 305° C.). H-NMR analysis was conducted on an NMR spectrometer sold under the trademark "BRUKER AM-400". $CDCl_3$ containing tetramethyl silane ("TMS") was used as the solvent. Quantitative determination of comonomer contents was calculated from the relative integration of the CH— peak of the lactide unit and the —$CH_2O$— peak for other lactone or cyclic compounds. In some cases, residual lactide contents were measured by H-NMR, according to the integration ratio of CH-peaks of monomer and polymeric lactide. Tensile testing was conducted using a tensile tester sold under the trademark "INSTRON MODEL 4302", according to ASTM D882–91. Impact testing was conducted on a dart drop film tester, according to ASTM D1709. Method A (26 inch height and 1.5 inch dart) was used unless indicated.

EXAMPLE 1

In a first series of experiments, polylactide homopolymer was blended with various low $T_g$ compounds, namely polycaprolactone or poly(ethylene glycol) and its properties compared to polycaprolactone and polylactide homopolymers (sample nos. 1 and 2) and a block copolymer of lactide and epsilon caprolactone (sample no. 7).

Table 1 presents the resulting properties, including tensile properties and the dart drop impact strength for cast films produced from these compounds. The films were cast in an extruder with a flat die manufactured by HAAKE.

TABLE 1

Testing Results for Polylactide Blends and Block Copolymers
Tensile Testing was conducted on pressed films, impact testing was done on cast films (unless indicated).

| Sample # | Description | Soft phase information Type | Soft phase information % (weight) | Film Appearance | Dart drop impact testing Thick (mils) | Dart drop impact testing Failure wt. g | Dart drop impact testing Failure wt. Wf g/mil | Tensile testing (pressed film) Young's modulus kpsi | Tensile testing (pressed film) At break stress, psi | Tensile testing (pressed film) At break E % |
|---|---|---|---|---|---|---|---|---|---|---|
| 1 | PCL | | | opaque | Not Available | | | 47 | 4636 | 801.5 |
| 2 | PLA (100% L) | none | 0 | clear | 4 | BDL** | BDL | 313.9 | 3677 | 4.2 |
| 3 | PLA/PCL (90/10) | PCL | 10 | milky | 3.55 | BDL | BDL | 308.9 | 1638 | 25.7 |

TABLE 1-continued

Testing Results for Polylactide Blends and Block Copolymers
Tensile Testing was conducted on pressed films, impact testing was done on cast films (unless indicated).

| Sample # | Description | Soft phase information Type | % (weight) | Film Appearance | Dart drop impact testing Thick (mils) | Failure wt. Wf g | g/mil | Tensile testing (pressed film) Young's modulus kpsi | At break stress, psi | At break E % |
|---|---|---|---|---|---|---|---|---|---|---|
| 4 | PLA/PCL (75/25) | PCL | 25 | milky | 3.95 | 40.7 | 10.3 | 243.4 | 3706 | 252.1 |
| 5 | PLA/PCL (60/40) | PCL | 40 | milky | 4.15 | 60.2 | 14.9 | 139 | 2591 | 119.3 |
| 6 | PLA/PCL/LBC (60/26.7/13.3) | PCL/BC | 40 | milky | 3.35 | 40.7 | 12.1 | 218.7 | 2189 | 91.9 |
| 7 | BLOCK COPOLYMER | ε-CL block | 30.5 | clear | 2.95 | BDL | BDL | 160 | 3576 | 443 |
| 8 | PLA/PEG (95/5) | PEG | 5 | clear | 2.5 | BDL | BDL | Not Available | | |
| 9 | PLA/PEG (90/10) | PEG | 10 | clear | 2.5 | BDL | BDL | Not Available | | |
| 10 | PLA/PEG (85/15) | PEG | 10 | clear | 2.5 | 65 | 26 | Not Available | | |
| 11 | PLA/PEG (80/20) | PEG | 20 | clear | 2 | Sticky, not tested | | Not Available | | |
| 12 | PLA/PEG (95/5) | PEG | 5 | clear | Not Available | | | 315.2 | 3444 | 4.2 |
| 13 | PLA/PEG (90/10) | PEG | 10 | clear | Not Available | | | 278.7 | 4440 | 3.6 |
| 14 | PLA/PEG (85/15) | PEG | 15 | clear | Not Available | | | 145.2 | 4174 | 332 |
| 15 | PLA/PEG (80/20) | PEG | 20 | clear | Not Available | | | 124.5 | 2421 | 211.9 |

*BC is a low molecular weight block copolymer formed from lactide blocks and epsilon caprolactone blocks, PEG has a molecular weight of 20,000. PCL has a molecular weight of 80,000.
**BDL means below detection limit, i.e., Wf < 40.7 g (i.e., 10 g/mil)

As shown in Table 1, the tensile properties of both the polycaprolactone/polylactide blends and the block copolymers were improved greatly compared to polylactide homopolymer. In particular, the elongation of the blends was much higher than that of the polylactide homopolymer. The fact that Young's modulus decreased with increasing polycaprolactone homopolymer amount is due to the fact that polycaprolactone homopolymer is more flexible than polylactide as shown by a comparison of samples 1 and 2. However, the Young's modulus for blends containing as high as 40% of polycaprolactone was 139 kpsi which is much higher than that of low and high density polyethylene (Young's modulus <70 kpsi). This indicates that flexible films with Young's modulus comparable to polyethylene cannot be obtained by compounding polycaprolactone alone into polylactide. The dart drop impact strength of polylactide/polycaprolactone blends containing 25% and 40 wt. % polycaprolactone (sample nos. 4 and 5) were 10.3 and 14.9 g/mil, respectively, as compared to the impact strength of less than 10 g/mil for polylactide (sample no. 2) and polylactide/polycaprolactone blend containing 10 wt. % polycaprolactone (sample no. 8). This indicates that the impact resistance of the polylactide/polycaprolactone blends was improved to some extent compared to polylactide homopolymer.

As for poly(ethylene glycol) as an additive in polylactide, the tensile properties showed effects similar to the polycaprolactone/polylactide system. The decrease of Young's modulus in polylactide/poly(ethylene glycol) blends was much more effective than polylactide/polycaprolactone blends. Surprisingly, it was found that polylactide/poly(ethylene glycol) blends showed good impact strength when poly(ethylene glycol) content was higher than 15 wt. % (sample nos. 11 and 15). The sample containing 20 wt. % poly(ethylene glycol) (sample no. 11) was blocking (i.e., gumming up the chill roll) and was not tested quantitatively. However, a qualitative measurement indicated the impact strength of this sample was greater than 80 g/mil. This is probably because poly(ethylene glycol) is miscible with polylactide in the range 0–30 wt. %, generating a single $T_g$. However, the attempt to measure $T_g$ in the study failed to get quantitative values because of the overlap of the $T_g$ of polylactide and the melting point of poly(ethylene glycol), both being in the range of 55°–60° C.

A low molecular weight block copolymer of epsilon caprolactone and lactide ("BC") ($M_w/M_n = 36,601/29,929 = 1.223$), was used as a compatibilizer in an attempt to improve the compatibility of polylactide and polycaprolactone (see sample no. 6). As compared to the polylactide/polycaprolactone system, polylactide/polycaprolactone/poly(lactide-co-caprolactone) with the same soft phase ratio did not show significant improvement of impact strength and flexibility. The low molecular weight block copolymer did not significantly increase the compatibility of polylactide and polycaprolactone.

EXAMPLE 2

A random copolymer of epsilon-caprolactone and lactide with about 20–70 mole percent of lactide is fully amorphous with a $T_g$ ranging from about –40° to about 30° C., depending on the composition. This copolymer is expected to effectively increase the impact resistance of a blend containing the copolymer and polylactide. The copolymer is generally elastomeric and expected to be more compatible with polylactide than the polycaprolactone homopolymer. Two random copolymers of epsilon-caprolactone/lactide, RCI and RCII, were made for the study. RCI was lactide rich (65 mole percent lactide) and RCII was epsilon-caprolactone-rich (75 mole percent epsilon-caprolactone), with a $T_g$ of 23.1° and –38.4° C., respectively. The testing results of the pressed and cast films of blends containing polylactide homopolymer and either RCI or RCII (sample nos. 19–26 and 31–34); polylactide homopolymer (sample no. 16); polylactide, polycaprolactone, and a compatibilizer (sample nos. 17 and 29); or polylactide and the compatibilizer (sample nos. 18 and 30) are listed in Table 2 below.

TABLE 2

Testing Results of Polylactide Blends and Copolymers
Tensile testing was conducted on pressed films. Impact testing was done on cast films.

| Sample # | Description | Type of Soft phase | Soft Phase % (weight) | Appearance | Thick (mils) | Impact testing, failure weight Wf (g) Wf, g | Wf, g/mil | Tensile testing (pressed film) Young's modulus kpsi | Stress at break psi | Strain at break % |
|---|---|---|---|---|---|---|---|---|---|---|
| 16 | PLA (100% L) | none | 0 | clear | 4 | BDL | BDL | 313.9 | 3677 | 4.2 |
| 17 | PLA/PCL/BC (60/26.7/13.3) | PCL/BC | 40 | milky | 3.35 | 40.7 | 12.1 | 218.7 | 2189 | 91.9 |
| 18 | PLA/BC (70/30) | BC | 30 | clear | 3.65 |  | BDL | 279 | 3168 | 6.6 |
| 19 | PLA/PCL/RCI (60/26.7/13.3) | PCL/RCI | 40 | milky | 3.5 |  | BDL | 192.2 | 2627 | 280 |
| 20 | PLA/RCI (80/20) | RCI | 20 | clear | 3.6 | BDL | BDL | 291.4 | 422 | 51.7 |
| 21 | PLA/RCI (70/30) | RCI | 30 | clear | 3.15 | BDL | BDL | 247.1 | 2597 | 210.9 |
| 22 | PLA/PCL/RCII (60/26.7/13.3) | PCL/RCII | 40 | milky | 3.1 |  | BDL | 119 | 1402 | 47.4 |
| 23 | PLA/RCII (90/10) | RCII | 10 | clear | 4.35 | 45.7 | 10.5 | 290.6 | 2239 | 8.8 |
| 24 | PLA/RCII (80/20) | RCII | 20 | clear | 4.05 | 49.3 | 12.2 | 239 | 2846 | 31.9 |
| 25 | PLA/RCII (70/30) | RCII | 30 | clear | 3.75 | 54.4 | 14.5 | 188.1 | 1912 | 19.1 |
| 26 | PLA/RCII (60/40) | RCII | 40 | clear | 3.2 | 86 | 20.6 | 67.9 | 496 | 8.1 |
| 27 | Block copolymer | ε-CL/LD = 80/20 | 37.5 | clear | 2.9 | 131 | 45.2 | 64.6 | 3481 | 440 |
| 28 | Block copolymer | ε-CL/LD = 80/20 | 45.5 | clear | 3.5 | 393 | 112 | 24.2 | 3351 | 525 |

*RCI and RCII are random copolymers with 35% and 75% of ε-CL respectively. PCL has a weight average molecular weight of 80,000.
**BDL means below detection limit, i.e., Wf <40.7 g.

TABLE 3

Testing Results of Polylactide Blends and Copolymers
Tensile testing was conducted on pressed films. Impact testing was done on cast films.

| | | Tensile testing of cast films (comparing machine and transverse directions) | | | | | |
|---|---|---|---|---|---|---|---|
| | | Machine direction | | | Transverse direction | | |
| Sample # | Description* | Young's modulus kpsi | Stress psi | Elongation % | Young's modulus kpsi | Stress psi | Elongation % |
| 29 | PLA/PCL/BC (60/26.7/13.3) | 280.1 | 3596 | 214.3 | 233.3 | 3171 | 49.2 |
| 30 | PLA/BC (70/30) | 286.5 | 2915 | 93.2 | 278 | 3574 | 27.9 |
| 31 | PLA/PCL/RCI (60/26.7/13.3) | 279.5 | 4190 | 156 | 196.7 | 2160 | 177.4 |
| 32 | PLA/RCI (70/30) | 266.6 | 3940 | 44.8 | 279.3 | 3236 | 78.1 |
| 33 | PLA/PCL/RCII (60/26.7/13.3) | 264.2 | 3622 | 173.9 | 152.3 | 2745 | 196.8 |
| 34 | PLA/RCII (70/30) | 283.3 | 3120 | 85.3 | 190.5 | 1951 | 37.6 |

The fact that the cast films of PLA/RCI and PLA/RCII had high clarity indicates that polylactide and epsilon caprolactone/lactide copolymers are compatible at the macroscopic scale. However, since two $T_g$s were detected, the blends are not fully miscible at the microscopic scale. The impact testing of the cast films show that the epsilon caprolactone-rich random copolymer (RCII) improved the impact-resistance of polylactide more efficiently than the lactide-rich copolymer (RCI). This is because RCII has a much lower $T_g$ than RCI (−38.8° and 23.1° C., respectively) and behaves more like the soft elastomer that is required for effective impact modification of brittle polymer matrices such as that of semi-crystalline polylactide. For the tensile testing results, both RCI and RCII increased the elongation (and, therefore, the impact strength) significantly, like polycaprolactone. Also, the amount of the RCI or RCII copolymers that were added was indirectly proportional to the Young's modulus of the blends (i.e., for large amounts of RCI and RCII copolymers, the materials became softer). In the case of a blend containing 40% of RCII, the Young's modulus was 67.9 kpsi which is close to that of high density polyethylene (about 60–100 kpsi); however, this material was quite weak with low stress at break (496 psi, compared to 3600 psi for polylactide) and low elongation at break (only 8.1%).

By way of comparison with blends, modified block copolymers having a copolymer of epsilon caprolactone/lactide as the soft phase (i.e., 80/20 of epsilon caprolactone/lactide) and polylactide as the hard phase were synthesized. By adding lactide into epsilon-caprolactone to form a random copolymer in the first step polymerization, the crystallinity of the soft phase (i.e., the polycaprolactone phase) in the block copolymer was eliminated. This is expected to render higher impact strength of the block copolymer materials because of the existence of the elastomeric soft phase. As shown in Table 2, the two modified block copolymers (sample nos. 27 and 28) showed significantly higher impact strength, compared to those of a block copolymer of lactide blocks and epsilon caprolactone blocks with the epsilon caprolactone blocks being the soft phase (sample no. 7) and all the blends tested.

For application in soft-flexible packaging materials, the Young's modulus of the films should be in the range of 20–90 kpsi. However, from the results mentioned above, the Young's modulus of the blends of polylactide with polycaprolactone or the block copolymers of lactide and epsilon caprolactone were higher than 100 kpsi. The blends of polylactide with poly(ethylene glycol) could have lower modulus; however, the water solubility of poly(ethylene glycol) prevented the addition of more than 15% poly (ethylene glycol) in most applications. Moreover, the hydroxyl end groups in poly(ethylene glycol) will possibly cause degradation of polylactide during compounding and processing, due to transesterification reactions. All of these considerations suggest that the addition of plasticizers a long with polymeric additives is necessary to make polylactide-based film more flexible, potentially with higher impact strength.

of talc and 1% of calcium stearate were added for anti-blocking purposes. A phosphite stabilizer, sold under the trademark "U-626," was added in the amount of 0.2% by weight as the stabilizer for polylactide. The results of impact and tensile testing are listed in Table 4.

TABLE 4

Tensile and Impact Testing Results for Blown Films with Plasticizers and Other Additives

| | | Composition (major components in weight %) | | | | | |
|---|---|---|---|---|---|---|---|
| Sample # | PLA* | Citroflex A-4 | soy oil | PEG | PCL | RCII | $T_g$, C |
| 35 | 3 arm, 98/2-L/D | 10 | | | | | 40 |
| 36 | 3 arm, 98/2-L/D | 12 | | | | | 35.6 |
| 37 | 4 arm, 98/2-L/D | 15 | | | | | 28.4 |
| 38 | 4 arm, 98/2-L/D | 20 | | | | | |
| 39 | linear, 98/2-L/D | 10 | 5 | | | | 34.3 |
| 40 | linear, 98/2-L/D | 10 | 5 | 5 | 5 | | |
| 41 | linear, 98/2-L/D | 10 | | | 10 | | |
| 42 | 4 arm, 98/2-L/D | 5 | | 5 | | | |
| 43 | 4 arm, 98/2-L/D | 10 | | 5 | | | 36.2 |
| 44 | 4 arm, 98/2-L/D | 10 | | | | 15 | |
| 45 | 4 arm, 98/2-L/D | 5 | 5 | 5 | 10 | | |
| 46 | linear, 98/2-L/D | 10 | 5 | 5 | 10 | | |
| 47 | linear, 98/2-L/D | 10 | 5 | 5 | 5 | | |

| | | Tensile testing*** (machine direction of blown film) | | | | | |
|---|---|---|---|---|---|---|---|
| | Impact** | Young's modulus, kpsi | | Yield stress | Yield strain | Stress at break | Elongation % |
| Sample # | g/mil | fast | slow | psi | % | psi | at break |
| 35 | BDL | 101 | 216 | undetectable | | 5593 | 5.1 |
| 36 | BDL | 132 | 149 | 6045 | 7 | 3930 | 22.7 |
| 37 | 145 | 29.6 | | 1278 | 7.9 | 4590 | 249 |
| 38 | 187.7 | 19.6 | 19.2 | no yield point | | 2750 | 152 |
| 39 | BDL | 106 | 117 | 5172 | 5.7 | 2757 | 13.8 |
| 40 | BDL | 73.3 | | 3738 | 7.2 | 3827 | 197 |
| 41 | BDL | 114 | 160 | 4761 | 6.3 | 4326 | 14.6 |
| 42 | BDL | 154 | 199 | undetectable | | 5285 | 35.8 |
| 43 | 19 | 46 | | 1996 | 6.9 | 3950 | 205 |
| 44 | 14.1 | 77.7 | | 3925 | 5.6 | 3942 | 305 |
| 45 | 37 | 83.2 | | 3467 | 6.8 | 4490 | 306 |
| 46 | >300 | 44.8 | | 2079 | 8.2 | 3829 | 365 |
| 47 | >300 | 63.6 | | 2489 | 7 | 3897 | 329 |

*The Mw/Mn values for linear, 3 arm and 4 arm PLAs are: 268566/146754 = 1.83, 137566/146754 = 1.54 and 280222/14645 = 1.91
**BDL is below detection limit.
***Tensile testing for all parameters was conducted at 20 in/min speed (fast speed), except in case af Young's modulus, some were tested at 0.2 in/min (slow speed) for comparison.

EXAMPLE 3

To verify this observation, various blends were made having a plasticizer and, in some cases, poly(ethylene glycol), polycaprolactone and/or RCII.

Acetyl tri-n-butyl citrate, sold under the trademark "CITROFLEX A-4" was chosen as a plasticizer for the study based on its degradability, non-toxicity, and compatibility with polylactide. Epoxidized soy oil was used as a co-plasticizer in some occasions. Two types of degradable polymers, poly(ethylene glycol) with a weight average molecular weight of 20,000 and polycaprolactone with a number average molecular weight of 80,000 were added along with the plasticizers. With the blown films, about 3%

As can be seen in Table 4, the $T_g$ and the Young's modulus of the films decrease with increasing plasticizer (CITROFLEX A-4) content. This means that the film becomes softer for greater amounts of the plasticizer. As the plasticizer level increased from 12% by weight to 15% by weight, the Young's modulus dropped from 132 kpsi to 29.6 kpsi and the impact strength increased from below detection limit (less than 10 g/mil) to 145 g/mil (see sample nos. 36 and 37). This indicates that the impact strength increases dramatically as the $T_g$ approaches room temperature. Considering that low density polyethylene has a Young's modulus of about 20 kpsi and an impact strength of about 100 to about 140 g/mil, polylactide containing about 15% by weight of plasticizer showed comparable properties as that of low density polyethylene. It is noted that some blocking on the blown film was observed when the plasticizer content was 15% by weight or more, while no blocking was observed for other compositions.

In some cases, epoxidized soy oil was added as a co-plasticizer of CITROFLEX A-4. No obvious effect on tensile and impact properties was observed. This indicates that epoxidized soy oil is not as effective a plasticizer as CITROFLEX A-4 for polylactide. However, its low price and possible role as lubricant during processing nonetheless make it attractive as an additive.

When poly(ethylene glycol) was added, the impact strength was improved and the film became softer. Poly(ethylene glycol) possibly acts like a plasticizer in terms of reducing $T_g$ and Young's modulus of the polymer blends.

Polycaprolactone and RCII did not enhance the impact strength of the films as much as plasticizers and poly(ethylene glycol). However, they increased the tensile strength at yield point of the films (sample nos. 44–47). This means that incorporation of polycaprolactone and rubber additives in polylactide along with plasticizer and poly(ethylene glycol) can make the film strong and flexible as well as impact-resistant.

EXAMPLE 4

In this example, the amenability of polylactide-based films as composting bags for lawn and garden/leaves was tested. Table 5 below lists the properties of three types of commercially available bags.

like poly(ethylene glycol) and polycaprolactone into polylactide along with plasticizers to formulate flexible film materials with enough impact resistance for this application. Other additives, such as anti-blocking reagents, antioxidants (or stabilizer), were also compounded. Typically, 1–3% by weight of talc and 1% by weight calcium stearate were added as anti-blocking agents, 0.2% of U-626 as a stabilizer.

All of the components were carefully dried prior to compounding and melt blending in the HAAKE mixer at 180° C. for 5 minutes. Thin blown films were made from these blends in the HAAKE extruder with a 1-inch circular die. The results of the test are set forth in Table 6 below:

TABLE 6

Tensile and Impact Testing Results for Blown Films with Plasticizers and Other Additives

| Sample # | PLA* | Citroflex A-4 | soy oil | PEG | PCL | talc | Comments for blown film |
|---|---|---|---|---|---|---|---|
| 48 | linear | 10 | 5 | 5 | 10 | 3 | good |
| 49 | linear | 15 | 0 | 5 | 10 | 2 | blocking/difficult to separate |
| 50 | linear | 10 | 5 | 10 | 0 | 3 | blocking/difficult to separate |
| 51 | linear | 10 | 5 | 0 | 15 | 3 | plasticizer migrated in 2 |

TABLE 5

Mechanical Properties of Commercial Bags

|  | Bag I | | Bag II | | Bag III | |
|---|---|---|---|---|---|---|
|  | MD | TD | MD | TD | MD | TD |
| Average Thickness (mils) | 1.84 | | 0.93 | | 0.98 | |
| Dart Drop Test (g) | 58.9 | | 129.4 | | 139.4 | |
| Tear Propagation Resistance Initial Load (lbf) | 0 | 0 | 0 | 0 | 0 | 0 |
| Tear Propagation Resistance Max Load (lbf) | 0.69 | 0.73 | 0.24 | 0.43 | 0.22 | 0.57 |
| Yield Strength Stress (psi) | 1462 | 1691 | 856 | 513 | 959 | 638 |
| % Elongation at Yield | 15 | 14 | 77 | 13 | 72 | 12 |
| Breaking Strength (psi) | 2870 | 2575 | 4004 | 2814 | 5520 | 3494 |
| % Elongation at Break | 508 | 450 | 465 | 725 | 453 | 717 |
| Stiffness - Modulus (psi) | 30070 | 33157 | 18101 | 22688 | 21163 | 26397 |

To formulate polylactide-based materials for degradable composting bags, it was initially proposed to make polylactide films with similar properties as Bag I. That is, the properties include a thickness of about 1–2 ml; a Young's modulus of about 30–60 kpsi; and a dart drop impact strength of about 50–100 g/mil. Polylactide with 2–15% of D-lactide can be plasticized by commercially available plasticizers, such as citrate esters, adipate esters and epoxidized soy oil, to afford flexible films with Young's modulus about 20–100 kpsi (depending on the level of plasticizer). At a level of greater than about 15% by weight plasticizer, the plasticized polylactide film showed impact strength comparable to that of low density polyethylene. However, some blocking was observed for the blown films when plasticizer content was more than about 15% by weight. Additionally, the film will become weaker (i.e., lower in yield strength or even no yield point at all) with increasing amounts of plasticizer.

In light of the above-mentioned results concerning the impact strength of polylactide blends and block copolymers, it was decided to blend commercially available polymers

TABLE 6-continued

Tensile and Impact Testing Results for Blown Films with Plasticizers and Other Additives

| Sample # | PLA | Citroflex A-4 | soy oil | PEG | PCL | talc weeks | Comments |
|---|---|---|---|---|---|---|---|
| 52 | 4 arm | 5 | 5 | 5 | 10 | 1 | good |
| 53 | linear | 10 | 5 | 5 | 10 | 1 | good |
| 54 | linear | 10 | 5 | 5 | 5 | 1 | good |

Tensile testing** (machine direction of blown film)

| Sample # | Impact g/mil | Young's modulus kpsi | Yield stress psi | Yield strain % | stress at break psi | Elongation % at break |
|---|---|---|---|---|---|---|
| 48 | 193 | 68.2 | 3085 | 5.9 | 4845 | 312 |
| 49 | 300 | 20.4 | no yield point | | 4792 | 319 |
| 50 | 250 | 49.3 | 2383 | 7 | 4654 | 343 |
| 51 | 19.2 | 74.4 | 3780 | 5.6 | 4498 | 310 |

TABLE 6-continued

Tensile and Impact Testing Results for Blown Films with Plasticizers and Other Additives

| 52 | 37   | 83.2 | 3467 | 6.8 | 4490 | 306 |
| 53 | >300 | 44.8 | 2079 | 8.2 | 3829 | 365 |
| 54 | >300 | 63.6 | 2489 | 7   | 3897 | 329 |

*The Mw/Mn values for linear and 4 arm PLAs (98/2-LD) are: 268566/146754 = 1.83 and 280222/146945 = 1.91
**Tensile testing for all parameters was conducted at 20 in/min speed (fast speed).

From the testing results of the blown films, five out of seven films (sample nos. 48–50 and 53–54) showed higher impact strength than low density polyethylene (about 100–140 g/mil as in Table 5). The Young's modulus of the sample numbers 48, 50, 53 and 54 were in the range of 40–70 kpsi, close to that of medium density polyethylene. However, the strength of the samples at both yield and break were higher than that of low density polyethylene (Table 5). Two compositions (sample nos. 49 and 50) with either high contents of plasticizer "CITROFLEX A-4" or poly(ethylene glycol) showed some blocking on the films. It was observed on one film (sample no. 51) that some plasticizer migrated to the surface of the film after about 2 weeks. This is due possibly to the high content of crystalline polycaprolactone (15% by weight) in this composition.

All of the films had clarity similar to polyethylene film with the same thickness. After the films were exposed at 40° C. in a 90% relative humidity chamber, no obvious changes were observed after one week. After nine weeks under these same conditions, the mechanical properties are not measurable and the sample showed extreme embrittlement. When they were immersed in water at room temperature, the films turned white after one day; however, no obvious loss in mechanical strength was observed.

A number of the films in Table 6 (i.e., samples 48 and 50–54) had similar flexibility to the films in Table 5, but higher tensile and impact strengths. The typical values of Young's modulus, tensile strength, tensile elongation and impact strength for the polylactide films were 45 kpsi, 3900 psi, 350% and 300 g/mil, respectively.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A degradable film having a high impact resistance, comprising a blend of:
   (a) at least about 50% by weight of a semi-crystalline polylactide;
   (b) at least about 3% by weight of a degradable impact modifier, wherein the degradable impact modifier has a weight average molecular weight of about 3,000 daltons or more and a glass transition temperature of about 0° C. or less; and
   (c) at least about 5% by weight of a degradable blend compatible plasticizer having a weight average molecular weight that is no more than about 2,000 daltons, wherein said degradable film has a breaking strength of at least about 1 kpsi and a Young's modulus of about 120 kpsi or less.

2. The degradable film of claim 1, wherein said degradable film comprises at least about 70% by weight poly (lactide).

3. The degradable film of claim 1, wherein said poly (lactide) has a weight average molecular weight of more than about 100,000 daltons.

4. The degradable film of claim 1, wherein said degradable film has an elongation to break of at least about 100%.

5. The degradable film of claim 1, wherein said degradable impact modifier is selected from the group consisting of polycaprolactone, poly(ethylene glycol) having a weight average molecular weight of 25,000 or less, a copolymer of lactic acid or an ester thereof and caprolactone, and poly (ethylene oxide) having a weight average molecular weight of 25,000 or less, and mixtures thereof.

6. The degradable film of claim 1, wherein said degradable film comprises from about 5 to about 45% by weight degradable impact modifier.

7. The degradable film of claim 1, wherein said degradable impact modifier has a weight average molecular weight of no more than about 150,000 daltons.

8. The degradable film of claim 1, wherein said degradable film comprises no more than about 15% by weight of said degradable plasticizer.

9. The degradable film of claim 1, wherein said degradable plasticizer is selected from the group consisting of citrate esters, adipate esters, epoxidized soy oil, acetylated coconut oil, linseed oil, and mixtures thereof.

10. The degradable film of claim 1, wherein said degradable plasticizer has a concentration in said degradable material ranging from about 8 to about 15% by weight.

11. The degradable film of claim 1, wherein said degradable film has a Young's modulus ranging from about 10 to about 90 kpsi.

12. The degradable film of claim 1, wherein said degradable film includes at least one of poly(ethylene oxide) and poly(ethylene glycol) and at least one of polycaprolactone and a copolymer of lactic acid or an ester thereof and caprolactone.

13. The degradable film of claim 1, wherein said degradable film has a dart drop impact strength ranging from about 30 to about 500 g/mil.

14. The degradable film of claim 1, wherein said degradable film has a yield strength less than about 7.0 kpsi.

15. The degradable film of claim 1, wherein said degradable film has a tear propagation resistance maximum load ranging from about 5 to about 250 grams force/mil.

16. The degradable film of claim 1, wherein said degradable film has a breaking strength ranging from about 1.0 to about 6.5 kpsi.

17. The degradable film of claim 1, wherein said degradable film has a shape memory above the glass transition temperature.

18. The degradable film of claim 1, wherein said degradable film is substantially free of starch.

19. A degradable film having a high impact resistance, comprising a blend of:
   (a) more than about 50% by weight of a semi-crystalline poly(lactide) having a weight average molecular weight of at least about 100,000 daltons;
   (b) at least about 5% by weight of a degradable blend impact modifier selected from the group consisting of polycaprolactone having a weight average molecular weight ranging from about 2,000 to about 150,000 daltons, poly(ethylene glycol) or poly(ethylene oxide) having a weight average molecular weight ranging from about 2,000 to about 25,000 daltons, a copolymer of lactic acid or an ester thereof and caprolactone having a weight average molecular weight ranging from about 2,000 to about 200,000 daltons, and mixtures thereof; and
   (c) at least about 5% by weight of a degradable blend compatible plasticizer that is substantially free of lactide and has a weight average molecular weight of 2,000 daltons or less, wherein said degradable film has a dart drop impact strength of at least about 30 g/mil.

20. The degradable film of claim 19, wherein said poly(lactide) has from about 90 to about 100% of one of L-lactide or D-lactide.

21. The degradable film of claim 19, wherein said degradable film has an elongation to break of at least about 100%.

22. The degradable film of claim 19, wherein said degradable film has a Young's modulus ranging from about 10 to about 90 kpsi.

23. The degradable film of claim 22, wherein said degradable film has a breaking strength of at least about 1 kpsi.

24. A degradable film having a high impact resistance, comprising a blend of:
   (a) more than about 50% by weight of a semi-crystalline poly(lactide), wherein said poly(lactide) has from about 90 to about 100% of one of L-lactide or D-lactide;
   (b) at least about 5% by weight of a degradable impact modifier, wherein said degradable impact modifier is selected from the group consisting of polycaprolactone, poly(ethylene oxide), poly(ethylene glycol), poly(lactide-co-epsilon caprolactone), and mixtures thereof; and
   (c) a degradable blend compatible plasticizer having a weight average molecular weight that is no more than about 2000 daltons, said plasticizer being selected from the group consisting of citrate esters, adipate esters, epoxidized soy oil, acetylated coconut oil, linseed oil, and mixtures thereof, wherein said degradable film has a Young's modulus ranging from about 10 to about 90 kpsi and an impact strength of at least about 30 g/mil.

25. The degradable film of claim 24, wherein said poly(lactide) has a weight average molecular weight ranging from about 100,000 to about 500,000 daltons.

26. The degradable film of claim 24, wherein said degradable film has a breaking strength ranging from about 1.5 to about 6.5 kpsi.

27. The degradable film of claim 24, wherein said degradable impact modifier has a weight average molecular weight of no more than about 120,000 daltons and a concentration in said degradable film of no more than about 45% by weight.

28. The degradable film of claim 24, wherein said degradable blend compatible plasticizer has a concentration in said degradable film ranging from about 5 to about 20% by weight.

29. The degradable film of claim 24, further comprising:
   a anti-blocking agent selected from the group consisting of calcium stearate, talc, zinc stearate, and mixtures thereof, said degradable anti-blocking agent having a concentration in said degradable film ranging from about 1 to about 10% by weight.

30. A degradable film having a high impact resistance, comprising a blend of:
   (a) at least about 50% by weight of semi-crystalline polylactide, wherein said polylactide has at least about 90% of one of L-lactic acid or D-lactic acid units;
   (b) from about 5 to about 45% by weight of a degradable impact modifier having a weight average molecular weight of at least about 3,000 daltons and a glass transition temperature of no more than about 0° C.; and
   (c) from about 5 to about 15% by weight of a degradable blend compatible plasticizer having a weight average molecular weight that is no more than about 2000 daltons, said plasticizer being substantially free of lactide, wherein said degradable film has a glass transition temperature of 45° C. or less and a dart drop impact strength of at least about 30 g/mil.

31. The degradable film of claim 30, wherein said degradable film has a Young's modulus ranging from about 10 to about 90 kpsi.

32. The degradable film of claim 30, wherein said degradable film has a dart drop impact strength ranging from about 30 to about 500 g/mil.

33. The degradable film of claim 30, wherein said degradable film has a yield strength ranging from about 1 to about 7 kpsi.

34. The degradable film of claim 30, wherein said degradable film has a tear propagation resistance maximum load ranging from about 5 to about 250 grams force/mil.

35. The degradable film of claim 30, wherein said degradable film has a breaking strength ranging from about 1.0 to about 7.0 kpsi.

36. A degradable film having a high impact resistance, comprising a blend of:
   (a) at least about 50% by weight of a semi-crystalline polylactide, wherein said polylactide has at least about 90% of one of L-lactic acid or D-lactic acid units;
   (b) from at least about 3 to about 15% by weight of a first degradable impact modifier that is at least one of poly(ethylene oxide) and poly(ethylene glycol);
   (c) from about 0.1 to about 15% by weight of a second degradable impact modifier that is at least one of polycaprolactone and a copolymer of lactic acid or an ester thereof with caprolactone; and
   (d) at least about 5% by weight of a degradable blend compatible plasticizer having a weight average molecular weight that is no more than about 2,000 daltons.

37. The degradable film of claim 36, wherein the blend is miscible.

38. The degradable film of claim 36, wherein the degradable film has a Young's modulus of about 120 kpsi or less, a breaking strength of at least about 1 kpsi, a percent elongation at break of at least about 50%, and a dart drop impact strength of at least about 30 g/mil.

39. The degradable film of claim 36, wherein the degradable plasticizer is miscible with polylactide and substantially non-toxic.

40. A method for forming a degradable film having a high impact resistance, comprising the steps of:
   (a) blending more than about 50% by weight of a semi-crystalline polylactide with a degradable impact modifier selected from the group consisting of polycaprolactone, poly(ethylene oxide), poly(ethylene glycol), poly(lactide-co-epsilon caprolactone), and mixtures thereof and a degradable blend compatible plasticizer selected from the group consisting of citrate esters, adipate esters, epoxidized soy oil, acetylated coconut oil, linseed oil, and mixtures thereof to form a degradable impact modified material;
   (b) forming said degradable impact modified material into a degradable film; and
   (c) biaxially orienting the degradable film to form an oriented degradable film, wherein the oriented degradable film has an impact strength of at least about 30 g/mil, a breaking strength of at least about 1 kpsi, and a Young's modulus of no more than about 120 kpsi.

41. The method of claim 40, wherein said oriented degradable film has an elongation to break of at least about 200%.

42. The method of claim 40, wherein the biaxially orienting step includes:
   (d) blowing said degradable film to form said oriented degradable film, wherein the blowup ratio ranges from about 1.5:1 to about 6:1.

43. The method of claim 40, wherein the drawdown ratio ranges from about 2:1 to about 40:1.

* * * * *